United States Patent [19]

Archdekin

[11] Patent Number: 5,623,186

[45] Date of Patent: Apr. 22, 1997

[54] POWER SAVING VOLTAGE REDUCTION SYSTEM FOR HIGH INTENSITY DISCHARGE LIGHTING SYSTEMS

[76] Inventor: James M. Archdekin, 1721 Normandy Pl., Santa Ana, Calif. 92705

[21] Appl. No.: 585,940

[22] Filed: Jan. 16, 1996

Related U.S. Application Data

[62] Division of Ser. No. 379,171, Jan. 27, 1995, Pat. No. 5,508,589.

[51] Int. Cl.$^6$ ................................................. H05B 41/16
[52] U.S. Cl. ...................... 315/276; 315/291; 315/360; 315/149
[58] Field of Search ................................ 315/276, 141, 315/288, 291, 362, 360, 149

[56] References Cited

U.S. PATENT DOCUMENTS

| | | | |
|---|---|---|---|
| 2,853,654 | 9/1958 | Swasey | 315/193 |
| 4,431,948 | 2/1984 | Elder et al. | 315/276 |
| 5,386,210 | 1/1995 | Lee | 340/567 |

*Primary Examiner*—Frank Gonzalez
*Assistant Examiner*—Reginald A. Ratliff
*Attorney, Agent, or Firm*—Leonard Tachner

[57] ABSTRACT

A small package voltage reduction system which is especially adapted for easy installation into a conventional high intensity discharge light, such as a street light having a receptacle for receiving a standard ambient light sensor. The invention permits extremely easy and thus inexpensive installation and maintenance and yet provides a significant reduction in energy use which may save significant expenditure for energy by a municipality or other user of high intensity discharge lights.

2 Claims, 4 Drawing Sheets

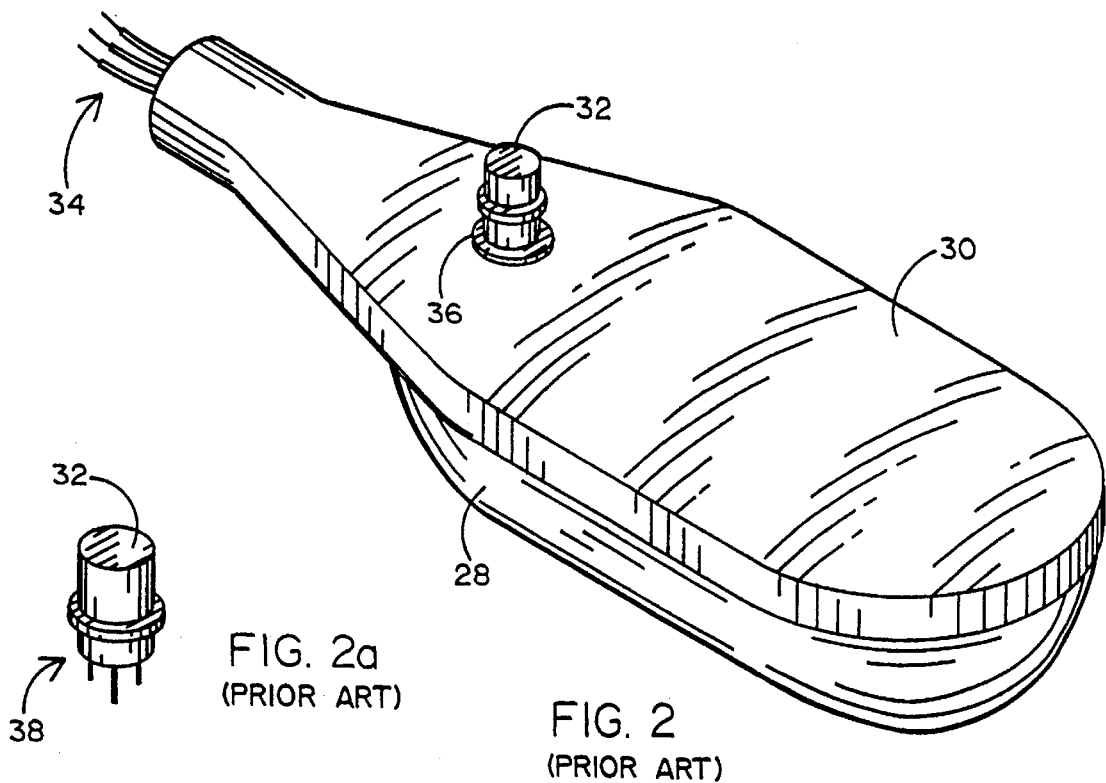
FIG. 2a (PRIOR ART)
FIG. 2 (PRIOR ART)
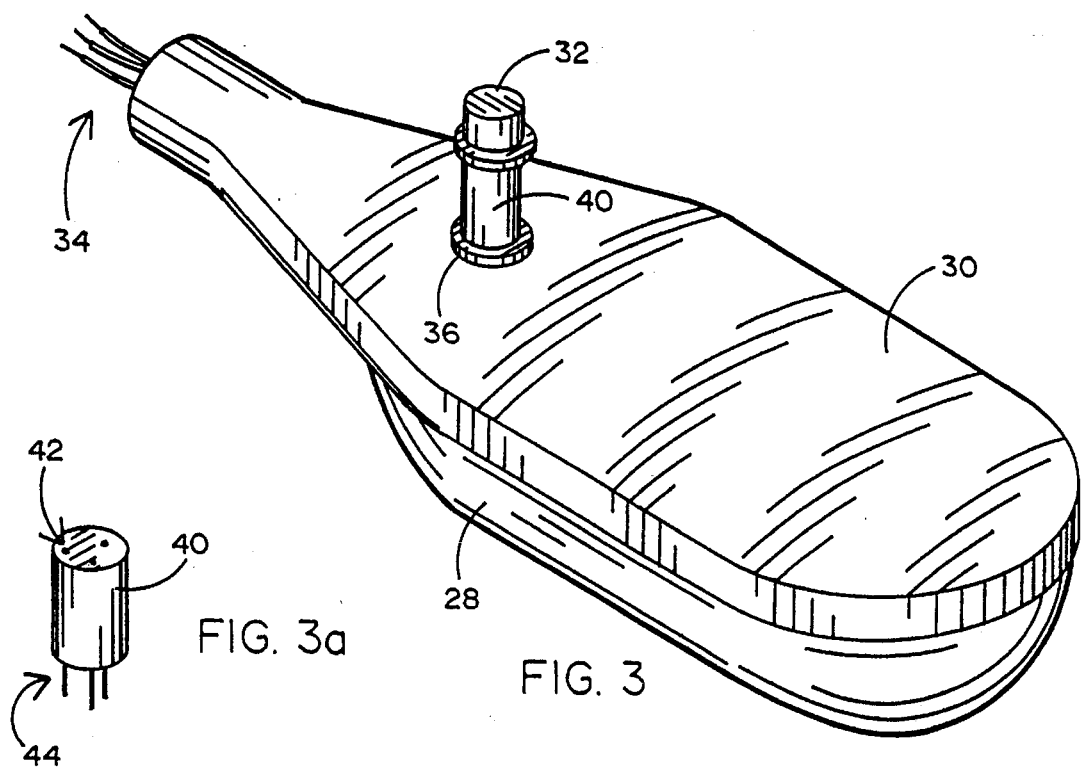
FIG. 3a
FIG. 3

5,623,186

POWER SAVING VOLTAGE REDUCTION SYSTEM FOR HIGH INTENSITY DISCHARGE LIGHTING SYSTEMS

CROSS-REFERENCE TO RELATED APPLICATIONS

The present application is a division of patent application Ser. No. 08/379,171, filed on Jan. 27, 1995 and entitled "POWER SAVING VOLTAGE REDUCTION SYSTEM FOR HIGH INTENSITY DISCHARGE LIGHTING SYSTEMS" now U.S. Pat. No. 5,508,589.

BACKGROUND OF THE INVENTION

1. Field of the Invention

The present invention pertains generally to apparatus for controlling the voltage applied to one or more high intensity discharge lights for purposes of conserving power and more specifically to an improved transformer apparatus for advantageously lowering the voltage applied to a lighting system after initial activation thereof.

2. Prior Art

The present invention is particularly suited to the function of permitting the application of a normal high voltage to a lighting load, such as a bank of high intensity discharge street lights and to thereafter selectively reduce the voltage to maintain such lights in a lighted condition but with reduced power consumption. The general concept of voltage reduction for the aforementioned purpose is well known in the art. By way of example, U.S. Pat. No. 2,429,162 issued Oct. 14, 1947 to Kaiser et al, discloses a number of alternative transformer configurations, utilizing a variety of switches and relays. These configurations permit the application of a nominal voltage to a plurality of fluorescent lights, followed by a reduction in that voltage subsequent to lamp lighting in order to maintain the lights in a lighting condition at a reduced power consumption. U.S. Pat. No. 4,189,664, issued Feb. 19, 1980 to Hirschfield, discloses another type of transformer configuration, utilizing a switch for selectively applying one of a plurality of taps from an autotransformer to a lighting load to reduce the voltage delivered to the load to thereby reduce the power consumed by the load.

The prior art concept which utilizes an autotransformer and a switching means for either selectively applying one or more taps of the transformer to the load or shorting portions of the autotransformer for controlling the voltage applied to the load, serves the aforementioned purpose of reducing power consumption in a light or a lighting load, but unfortunately suffers from a number of disadvantages which the present invention overcomes. By way of example, in such prior art disclosures, the switch unit that is used to control the voltage applied to the load is normally interposed between the line power and the load. As a result, it must be capable of supporting the entire load current on either the input or output power of the autotransformer. To withstand such high current carrying requirements, such switching devices are large and bulky and are commensurately expensive. Furthermore, their large size makes it difficult to integrate such power consumption reducing devices into existing street lighting because the large package size cannot be easily accommodated in the existing lighting structure and must therefore be specially installed underground, requiring expensive and time consuming installation procedures.

Other relevant patents that disclose the use of relay controlled transformer windings for load power consumption reduction include the following. U.S. Pat. No. 2,180,193 to Brand, U.S. Pat. No. 2,853,654 to Swasey and U.S. Pat. No. 3,652,824 to Okada. Perhaps the most relevant prior patent is U.S. Pat. No. 4,431,948 issued to Elder et al, on Feb. 14, 1984. The parent application of which the present application constitutes a continuation-in-part, discloses an improvement over that prior patent that was made necessary to solve a significant disadvantage. This disadvantage occurred during maximum voltage application when the relay or equivalent switching device was in its open configuration, thus disconnecting the common winding of the autotransformer from the series winding of the autotransformer. It was founded that in the full voltage mode, the current in the series winding produced a significant magnetic field which induced magnetic flux saturation in the metal portion of the common winding which caused two problems. One such problem was that the magnetic field caused the common winding to produce a voltage which caused the common winding, even though disconnected electrically from the series winding to induce harmonic distortion in the series winding which effectively reduced the amplitude of the voltage available from the series winding during the full voltage configuration. The reduction in voltage was significant and in some cases making it difficult or impossible to turn on fluorescent or other arc type light systems during the high voltage start-up mode. Another problem associated with the magnetic flux saturation of the common winding metal structure was that it heated the metal structure of the autotransformer so significantly that it tended to destroy the insulation in the coil which could result in catastrophic effects. The aforementioned parent application discloses a solution to that disadvantage, namely the inclusion of a bucking coil in parallel with the common winding of the autotransformer which is switched into that configuration only when the common winding is disconnected from the series winding. The autotransformer is thus provided with an additional winding, namely a bucking coil winding which is wound in bifilar opposite relation with the common winding of the autotransformer. This bifilar bucking coil winding is, because of its opposite direction of winding, designed to cancel out all of the ill effects described with respect to the unitary common winding of the prior art. Consequently, despite the continuing high magnetic field generated by the series winding of the autotransformer in the high voltage mode, any harmonics generated in the common winding are, in effect, cancelled by the equal and opposite generation of harmonics in the bucking coil. In fact, any voltage generated in the common winding as a result of magnetic effects on the common winding by the current flow through the series winding, are exactly cancelled by the equal and opposite effects generated in the bucking coil winding. As a result, no heat is generated of any significance in the metal structure of the autotransformer and harmonic distortion of the full voltage alternating sine wave is eliminated to the point where the full voltage or virtually full voltage can be achieved in that mode, thus enabling the necessary high voltage to initiate the arc start of high intensity discharge lights, such as street lights disclosed herein.

SUMMARY OF THE INVENTION

The present invention incorporates the space saving, low current handling advantages of the disclosure of prior art U.S. Pat. No. 4,431,948 and the problem solving characteristics of the disclosure of the parent application of which the present application is a continuation-in-part. Furthermore, the present invention provides a significant additional improvement that is especially suitable for use in modifying typical street light structures without any significant installation cost, thus making it possible for municipalities and the like to save a significant amount of energy and the cost for such energy by modifying their street lights, but without incurring any significant maintenance or installation expenses that would otherwise be required without the novel end unobvious characteristics of the present invention.

It will be seen hereinafter that the street lights to which the present invention is directed are of the type which use a lamp structure having an external ambient light sensor. The sensor is designed to respond to the reduction in ambient light, such as for example at dusk, to automatically activate the high intensity discharge street light by switching the line voltage, such as 120 volts AC into the primary transformer winding of the ballast transformer to activate the light. Because such ambient light sensors must be externally positioned to respond to ambient light, the present invention is designed to be received by the very same receptacle that such ambient light sensors are normally received in lamp structures of the type herein disclosed. In addition, the invention herein described, provides a receptacle identical to the lamp structure for receiving the ambient light sensor. Thus, in effect, the present invention comprises a voltage reduction apparatus which is interposed between the ambient light sensor and the lamp structure commonly used in street lighting.

Thus, enabling installation of the present invention may be accomplished by simply withdrawing the ambient light sensor from the lamp structure and instead installing the voltage reduction apparatus which then receives the ambient light sensor with a receptacle identical to that provided by the lamp structure. Thus, because of the novel and unobvious characteristics, the advantages of voltage reduction and energy savings resulting therefrom may be achieved in conventional street light structures, without any internal modification to the street light or any rewiring thereof.

The small package advantages of the invention derived from achieving unique electrical characteristics may be exploited for street lighting installation with almost trivial expense or installation labor, thus making it highly cost effective to provide the energy saving characteristics of the present invention. In addition, because of the relatively small volume requirements of the present invention in even a high current capacity configuration, the present invention may be installed for use with a series of street lights or strings of street lights without requiring any special housing or construction requirements for such an installation.

OBJECTS OF THE INVENTION

It is therefore a principal object of the present invention to provide a voltage reduction apparatus for reducing power consumption in high intensity discharge lighting systems, such as street lights in a configuration which permits minimum installation expense.

It is a further object of the present invention to provide a voltage reduction apparatus for reducing power consumption in street lighting by exploiting the receptacle available in structures of such street lights for receiving an ambient light sensor which may be then instead be installed in a light receptacle of the present invention.

It is still a further object of the present invention to provide a voltage reduction apparatus for decreasing power consumption in high intensity discharge lighting systems by utilizing the package design which can be sufficiently small to obviate any requirement for costly installation procedures involving refurbishment of street lighting systems.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the accompanying drawings in which:

FIGS. 2 and 2a are three dimensional illustrations of a street lamp structure of the prior art with which one embodiment of the present invention is designed to operate;

FIGS. 3 and 3a are views of a street lamp structure, similar to that of FIG. 2, but illustrating the configuration thereof after installation of an embodiment of the present invention;

DETAILED DESCRIPTION OF A PREFERRED EMBODIMENT

Figure 1:
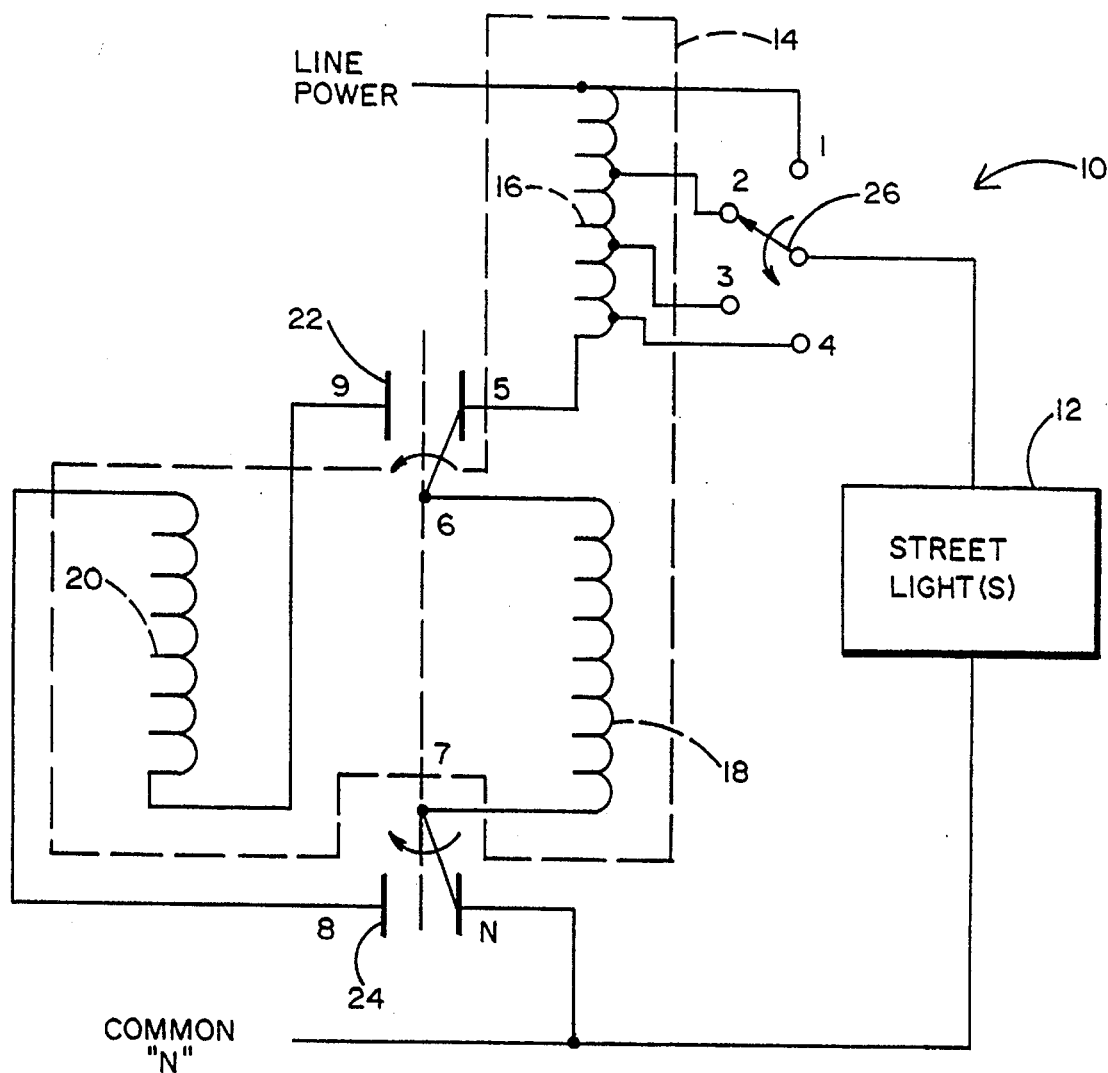
FIG. 1 is a schematic illustration of a voltage reduction apparatus used in the present invention.

Referring now to FIG. 1, it will be seen that a voltage reduction system 10, according to the present invention, is connected to a load 12, such as at least one street light for selectively applying a reduced voltage thereto. The voltage reduction system 12 comprises an autotransformer 14, having a series winding 16 and a common winding 18, the latter having a bucking coil 20 selectively connected in parallel therewith, depending upon the position of relay switches 22 and 24. Series winding 16 provides a plurality of taps which may be connected to the street lights 12, depending upon the position of a selection switch 26.

The details of operation of the voltage reduction system 10 may be best understood by referring to the parent application, Ser. No. 08/356,837, filed Dec. 14, 1994 and to which this application is a continuation-in-part. However, for purposes of background herein, it will be understood that the position of relay switches 22 and 24 determines whether high voltage, that is line power voltage, is applied to the street lights 12 or instead a reduced voltage, depending upon the position of selection switch 26 is applied to the street lights 12. More specifically, when the relay switches 22 and 24 are positioned to connect the common winding 18 to the bucking coil 20 and disconnected from the series winding 16, line power voltage is applied to the street lights. This higher level of voltage is used to initiate or activate the street lights which are typically high intensity discharge lights which require full line power voltage in order to start or create an arc in lamps used in typical street lights. However, after a preselected period of time, typically less than 10 minutes after an arc has been established and stabilized in the street lights 12, the relay switches 22 and 24 are switched to connect the common winding 18 to the series winding 16 and to disconnect the common winding 18 from the bucking coil 20. In this manner, a voltage divider is created between line power input and common "N" which reduces the voltage applied to the street lights 12 to some value below the line power voltage, depending upon the position of selection switch 26. The manner in which this circuit may be used advantageously to reduce power consumption in street lights, may be better understood by referring now to FIGS. 2 through 4, which illustrate one embodiment thereof and to FIG. 5 which illustrate an alternative embodiment thereof.

More specifically, referring now to FIGS. 2 and 3, it will be seen that a prior art high intensity discharge light 28, provides a lamp structure 30 to which there is connected an ambient light sensor 32, plugged into a receptacle 36 for controlling voltage applied to the light 28 through wiring 34. As seen further in FIG. 2a, a prior art ambient light sensor typically used in the lamp structure 30, shown in FIG. 2, comprises a three pin plug 38, which is adapted to be received in receptacle 36. Ambient light sensor 32 is a conventional photoelectric device which provides a simple switching characteristic depending upon the level of light incident upon the sensor. In a typical configuration, the light sensor 32 provides an open switch configuration when light levels exceed a selected threshhold and a closed switch configuration when light levels fall below that threshhold. Typically, the threshhold is set to correspond to the light level at dusk, shortly before full darkness so that the light is activated when the ambient light level falls below a magnitude which make it advantageous to have synthetic light generated by a street lamp, such as high intensity discharge light 28.

The voltage reduction apparatus 40 of the present invention is configured, as shown in FIG. 3 and 3a, to be interposed between the ambient light sensor 32 and the receptacle 36 of lamp structure 30. More specifically, as seen in FIG. 3a, the voltage reduction apparatus 40 provides a receptacle 42, which is a duplicate of the receptacle 36 of the lamp structure. In addition, voltage reduction apparatus 40 provides a three pin plug 44 which simulates the pin arrangement of the ambient light sensor 32 so that it is compatible with the receptacle 36 of the lamp structure 30. Thus, it will be seen that installation of the present invention in the configuration illustrated in FIGS. 3 and 3a, is accomplished simply by way of temporarily removing the ambient light sensor 32 from the receptacle 36 and instead installing the voltage reduction apparatus 40 into the receptacle 36. Then, the ambient light sensor 32 is placed into the receptacle 42 of the voltage reduction apparatus 40 so that the ambient light sensor continues to carry out its function previously described in an identical manner. However, as will be seen hereinafter in conjunction with FIG. 4, the voltage applied to the high intensity discharge light, may be automatically reduced after initial arc activation upon expiration of a preselected period of time when arcing and stabilization of the light 28 are assured.

Figure 4:
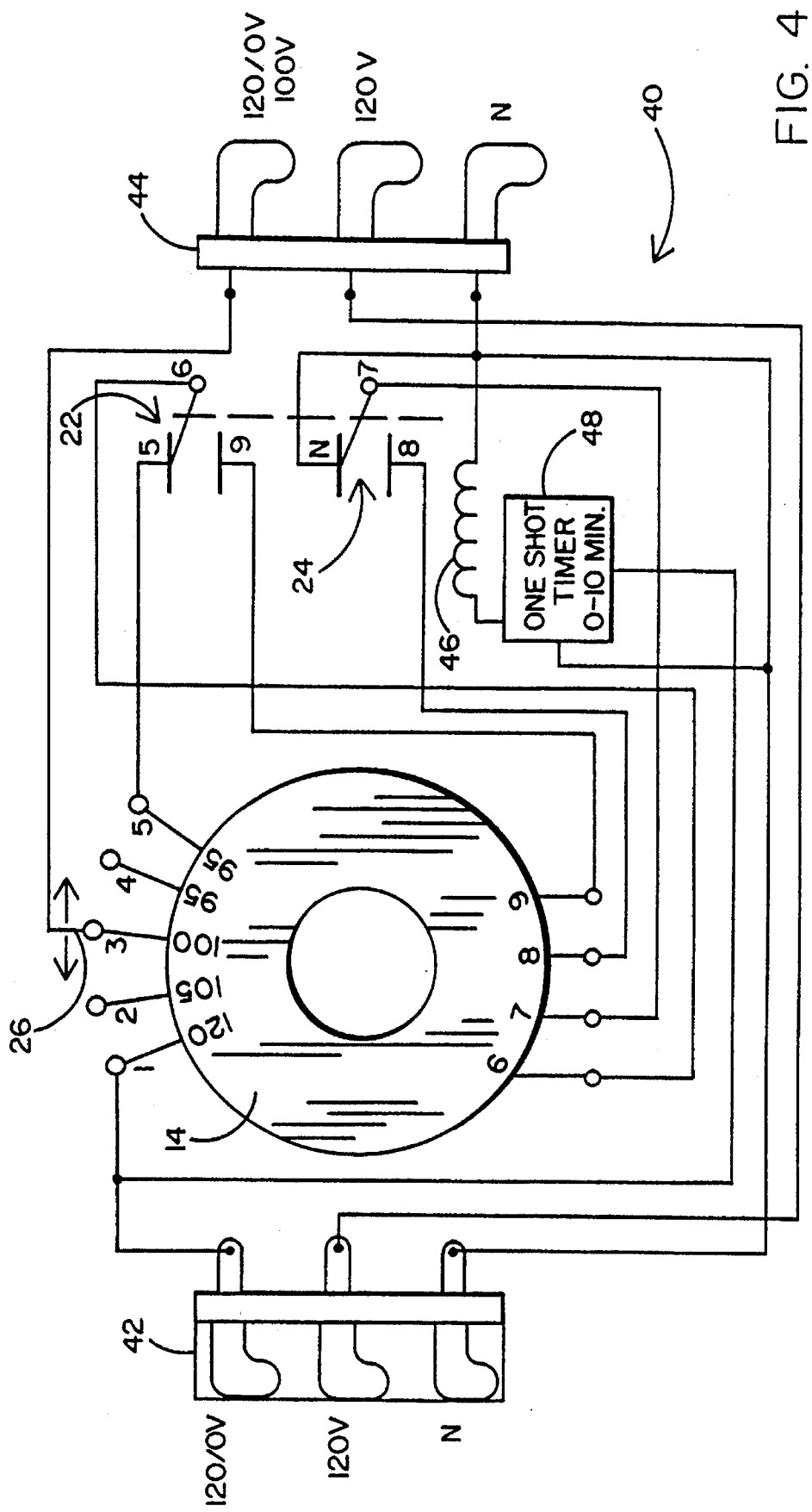
FIG. 4 is a schematic illustration of a configuration of the voltage reduction apparatus especially suitable for use with lamp structures in the manner shown in FIG. 3.

Referring now to FIG. 4, it will be seen that the voltage reduction apparatus 40 provides the receptacle 42 at one end and the three pin plug 44 at the other. It also provides the aforementioned autotransformer 14, having a plurality of taps to which the selection switch 26 may be connected. In addition, the voltage reduction apparatus 40 provides the relay switches 22 and 24, which are connected to the toroidal autotransformer 14 in the manner previously described schematically in conjunction with FIG. 1. Voltage reduction apparatus 40 also provides a relay coil 46, which is electrically connected to the relay switches 22 and 24 to activate those switches upon the passage of current through the relay coil. Relay coil 46 is connected to a voltage reduction timer 48, which is a one shot timer having a selectible period of up to 10 minutes. In the design of the preferred embodiment of FIG. 4, the one shot timer is configured to permit current to flow through relay coil 46 when the ambient light sensor 32 of FIG. 3 is actually activated which occurs when the 120 volt pin of receptacle 42 is switched into a closed position, relative to the 120/0 volt of receptacle 42. This occurs when the ambient light level falls below the aforementioned threshhold. When this occurs, current flows through the relay coil 46, holding the relay switches 22 and 24 in a position which disconnects the common winding 18 from the series winding 16 of FIG. 1, thus applying 120 volts or full line voltage to the high intensity discharge light to which 3-pin plug 44 is connected. However, after the one shot timer period has expired, relay coil 46 ceases to carry current, thereby releasing relay switches 22 and 24, which, in turn, connects the common winding 18 to the series winding 16 of the autotransformer 14, as seen schematically in FIG. 1. When this occurs, the top pin of 3-pin plug 44 as seen in FIG. 4 is effectively applied to a reduced voltage source, namely the appropriately selected tap on the autotransformer 14 which forms part of the aforementioned voltage divider, formed by the combination of the common winding 18 and the series winding 16. When this occurs, the reduced voltage is applied to the high intensity discharge light 28 instead of the line voltage. By way of example, in the illustration shown in FIG. 4, the reduced voltage is 100 volts and the full line voltage is 120 volts. Thus, it will be seen that for a period of up to 10 minutes after the ambient light sensor switches into its light activating condition, 120 volts is applied to the high intensity discharge light 28 of FIG. 3. Subsequent to that initial period of time, the voltage is automatically reduced by the switching of relay switches 22 and 24 and the voltage to the high intensity discharge light 28 drops to 100 volts.

Thus, it will be understood that the present invention provides a small package voltage reduction system which is especially adapted for easy installation into a conventional high intensity discharge light, such as a street light having a receptacle for receiving a standard ambient light sensor. The invention permits extremely easy and thus inexpensive installation and maintenance and yet provides a significant reduction in energy use which may save significant expenditure for energy by a municipality or other user of high intensity discharge lights.

The present invention may also be used in conjunction with a plurality of street lights or a string of lights as they are commonly referred to in the trade. Of course, such a multiple street light use would involve the requirement for a higher current carrying capability and thus result in a package size that is larger than practical for substitution into the receptacle of each lamp structure. Even though it may be necessary to use a larger voltage reduction apparatus package when connecting such a voltage reduction apparatus to a plurality of street lights of up to 30 such lights simultaneously in the manner disclosed in FIG. 5 herein, it will be understood that the installation effort required per street light is still quite minimal.

Figure 5:
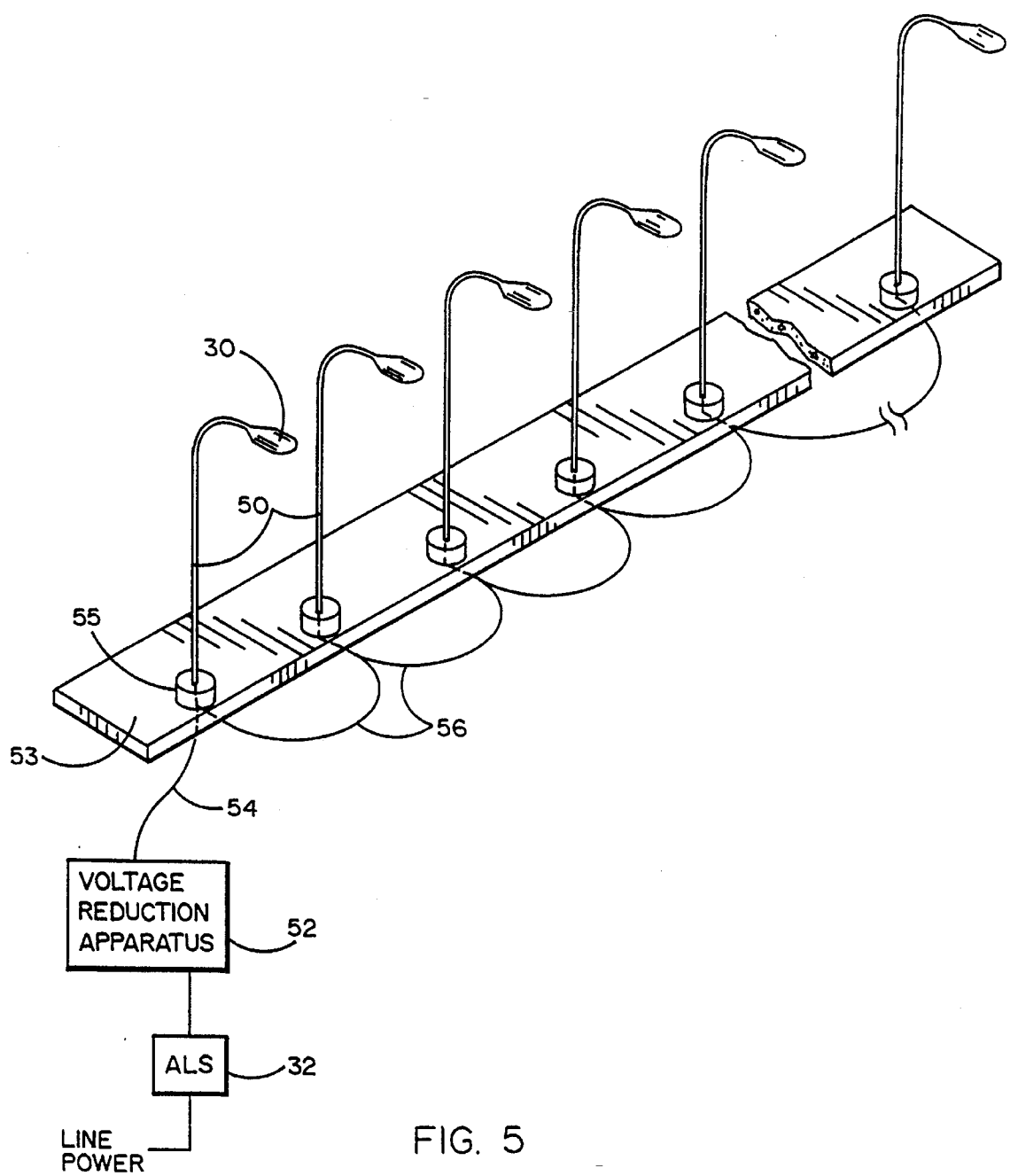
FIG. 5 is an illustrative drawing of a typical installation of the present invention with a plurality of street lamps in a string configuration.

As seen in FIG. 5, a voltage reduction apparatus 52 is connected to line power and is, in turn, connected to a plurality of street lights 50, each installed on a street surface 53. The voltage reduction apparatus output is applied through a power cable 54 through a base 55 of a first street light 50, but is, in turn, connected by a plurality of power cables 56 in a daisy-chain configuration to the remaining street lights 50 of the plurality thereof.

Operation of the voltage reduction apparatus 52 is virtually identical to that of the schematic of FIG. 1 and the configuration of FIG. 4. The size of components is greater to accommodate the higher current carrying capacity of a voltage reduction apparatus that is attached to a string of street lights numbering as high as 30 or more. In the configuration of FIG. 5, wherein a voltage reduction apparatus is connected to a plurality of high intensity discharge lights, a single ambient light sensor 32 or ALS, may be connected to the voltage reduction apparatus 52 to apply line power thereto upon the reduction of ambient light below the aforementioned preselected threshhold level. Thus, the configuration of FIG. 5 is essentially identical to the configuration of FIGS. 3 and 4, except that the voltage reduction apparatus is designed to support a larger current carrying capacity for application to a plurality of street lights instead of just one such light.

Those having ordinary skill in the art to which the present invention pertains, will now as a result of the applicant's teaching herein, perceive various modifications and additions which may be made to the invention. By way of example, the particular configuration of the present invention shown for use as an addition to a conventional lamp structure may be readily altered to accommodate other forms of receptacles in such lamp structures. Furthermore, the relay switches described herein may be readily replaced by other types of switches such as high power semi-conductor switches. Accordingly, all such modifications and additions which may be made to the invention are deemed to be within the scope thereof, which is to be limited only by the claims appended hereto and their equivalents.

I claim:

1. A street light comprising:

a high intensity discharge light source;

an ambient light sensor connected to activate said light source upon reduction of ambient light below a selected threshold;

a voltage reduction circuit connected to said light source to selectively reduce the voltage applied thereto; and a timer connected to said sensor and to said voltage reduction circuit, said timer being configured to begin timing upon activation of said light source by said sensor and to terminate timing upon passage of a selected period of time after said activation of said light source;

said voltage reduction circuit having a switch responsive to said timer for reducing the voltage applied to said light source upon said termination of timing.

2. A street lighting system comprising:

a plurality of high intensity discharge light sources;

an ambient light sensor connected to activate said light sources upon reduction of ambient light below a selected threshold;

a voltage reduction circuit connected to said light sources to selectively reduce the voltage applied thereto; and a timer connected to said sensor and to said voltage reduction circuit, said timer being configured to begin timing upon activation of said light sources by said sensor and to terminate timing upon passage of a selected period of time after said activation of said light sources;

said voltage reduction circuit having a switch responsive to said timer for reducing the voltage applied to said light sources upon said termination of timing.

* * * * *